March 9, 1937. O. M. DEAN 2,073,195
FUR CUTTING MACHINE
Filed Jan. 16, 1935 7 Sheets-Sheet 6
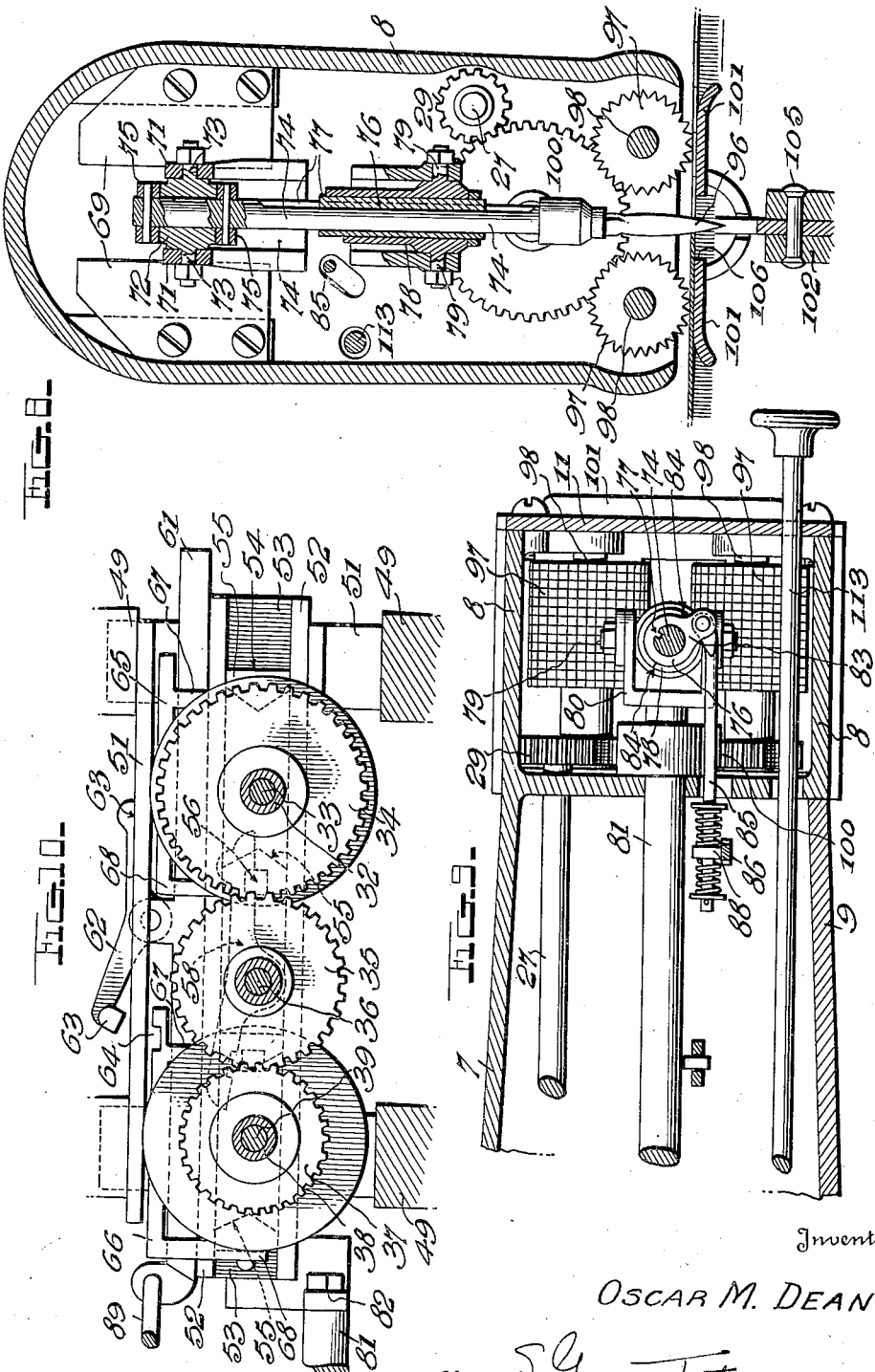
Inventor
OSCAR M. DEAN
By S. George Tate
Attorney

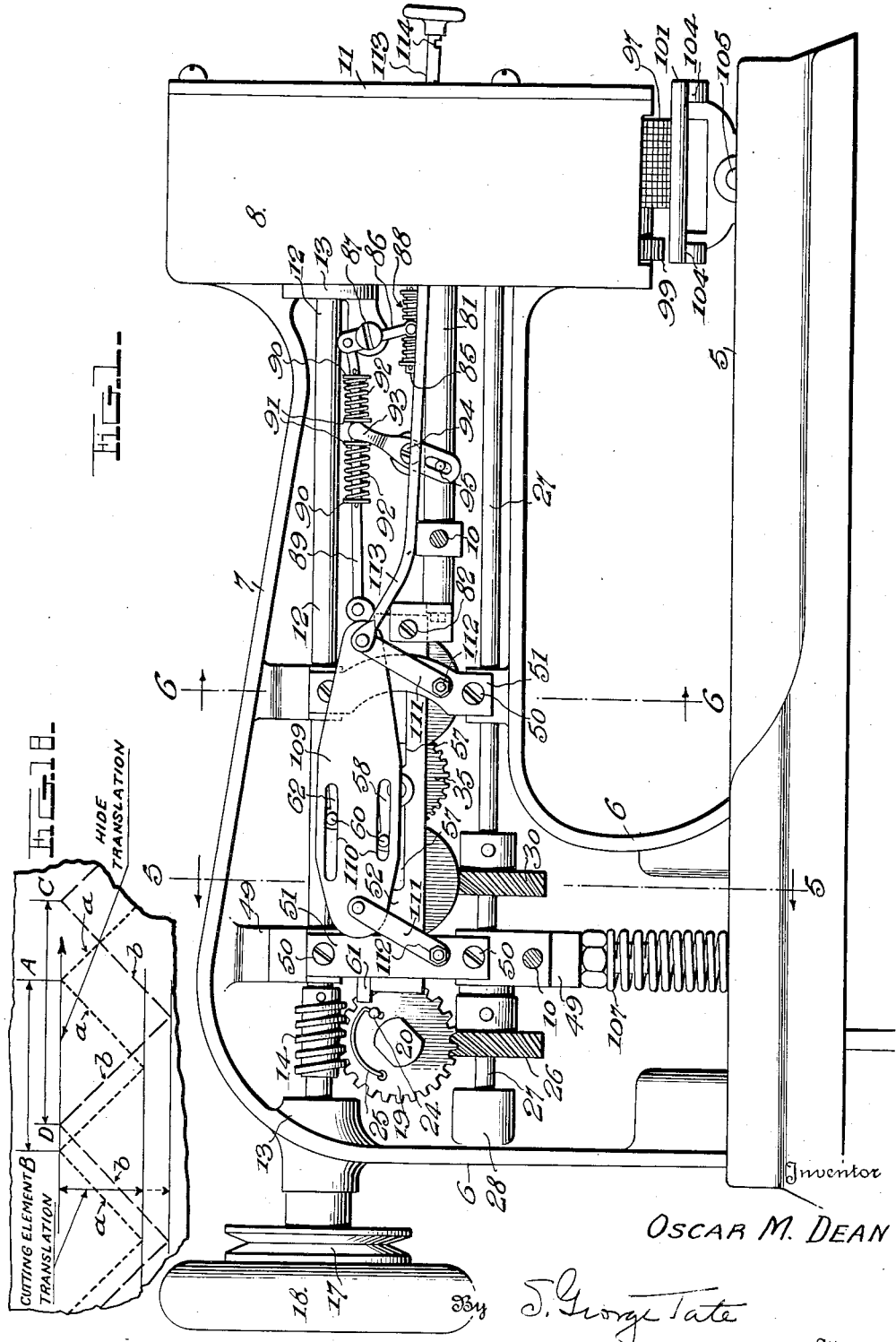

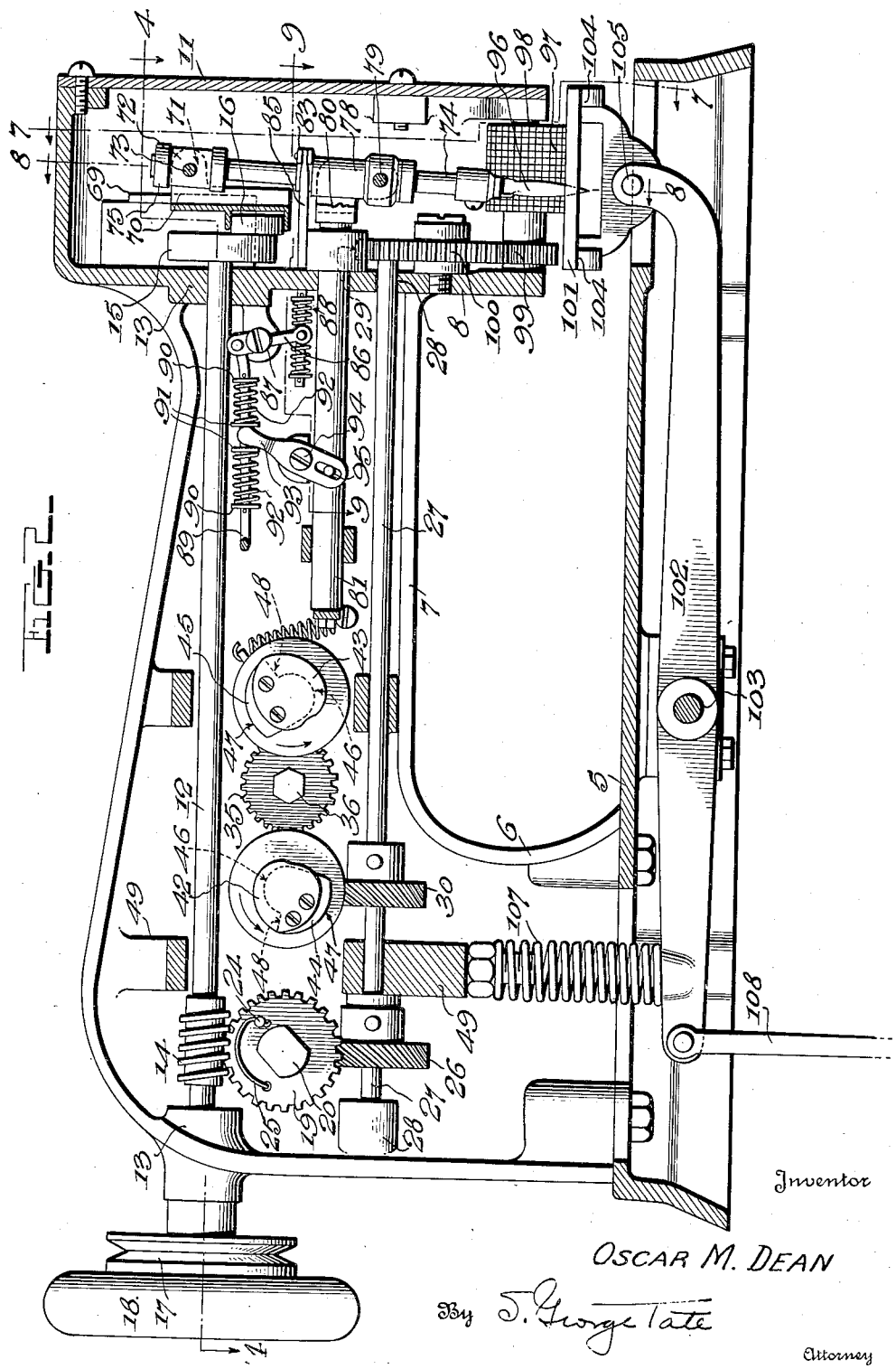

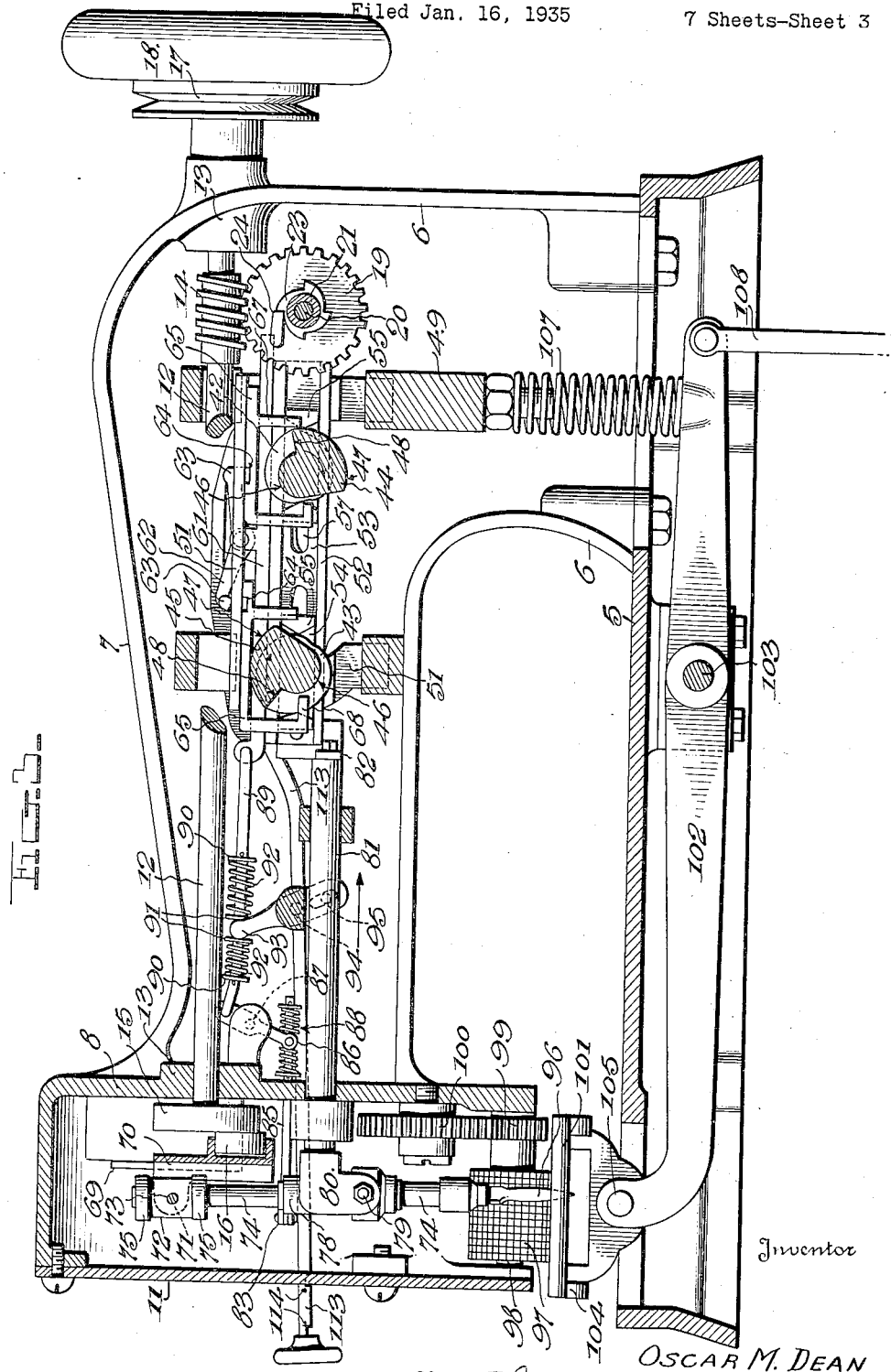

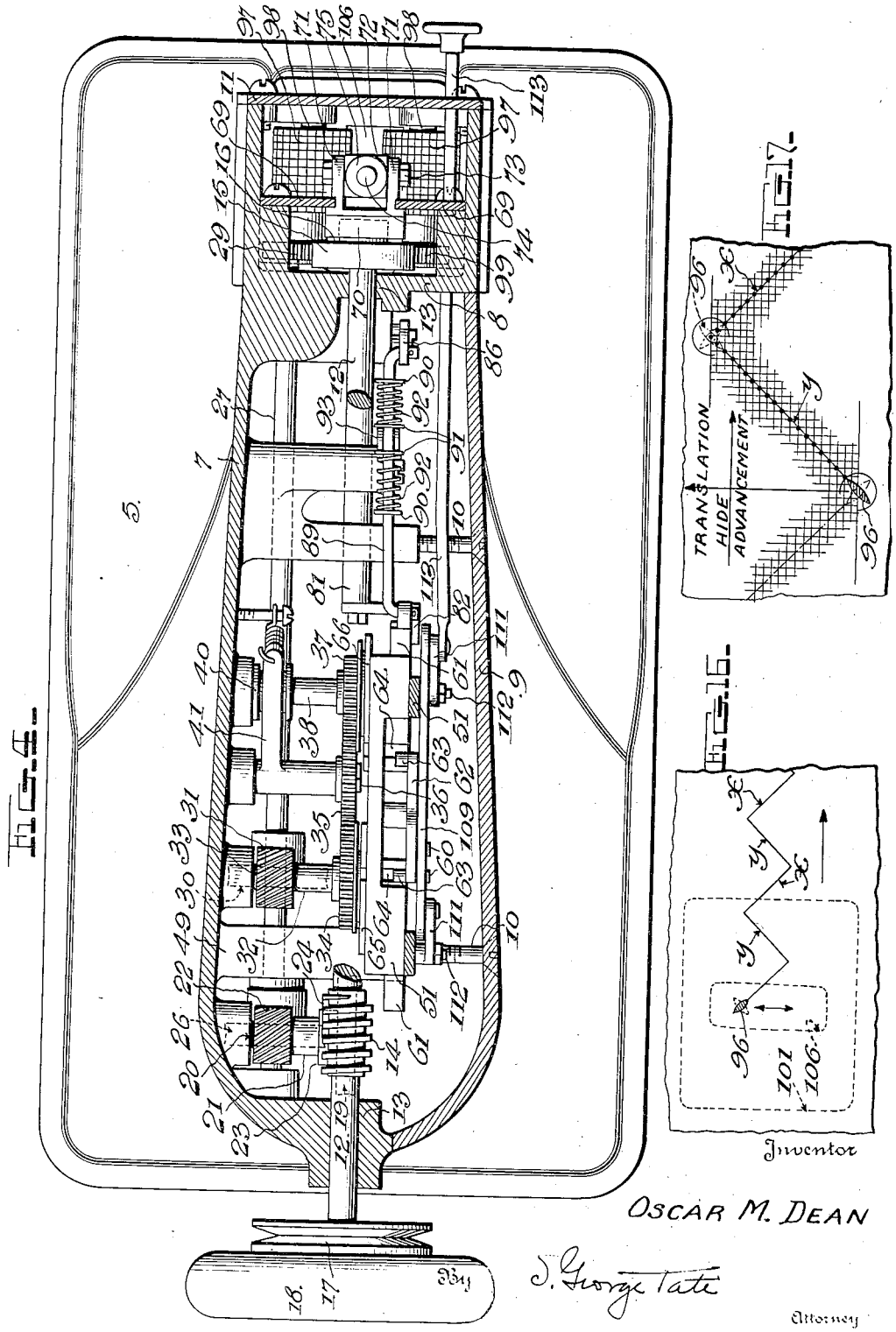

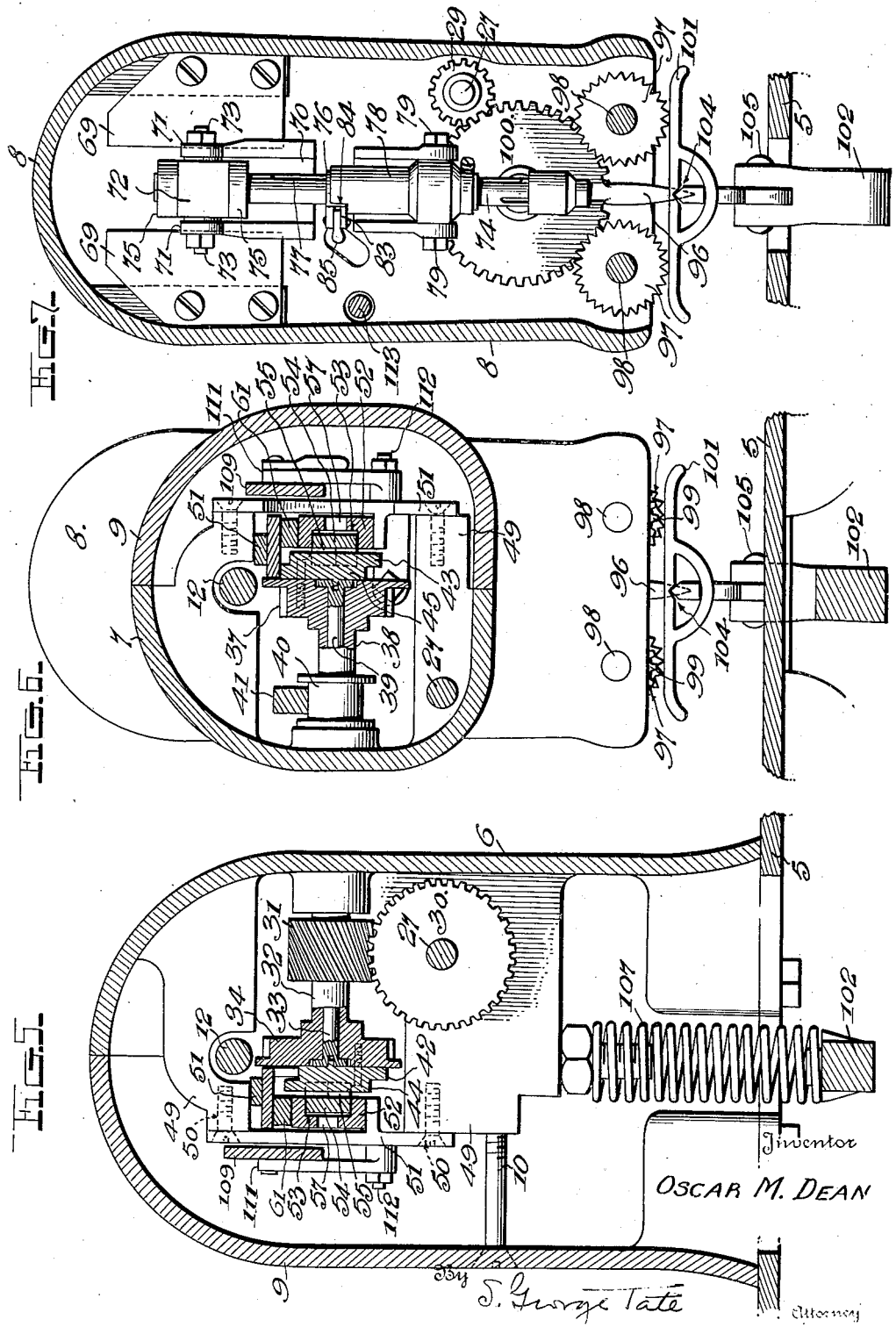

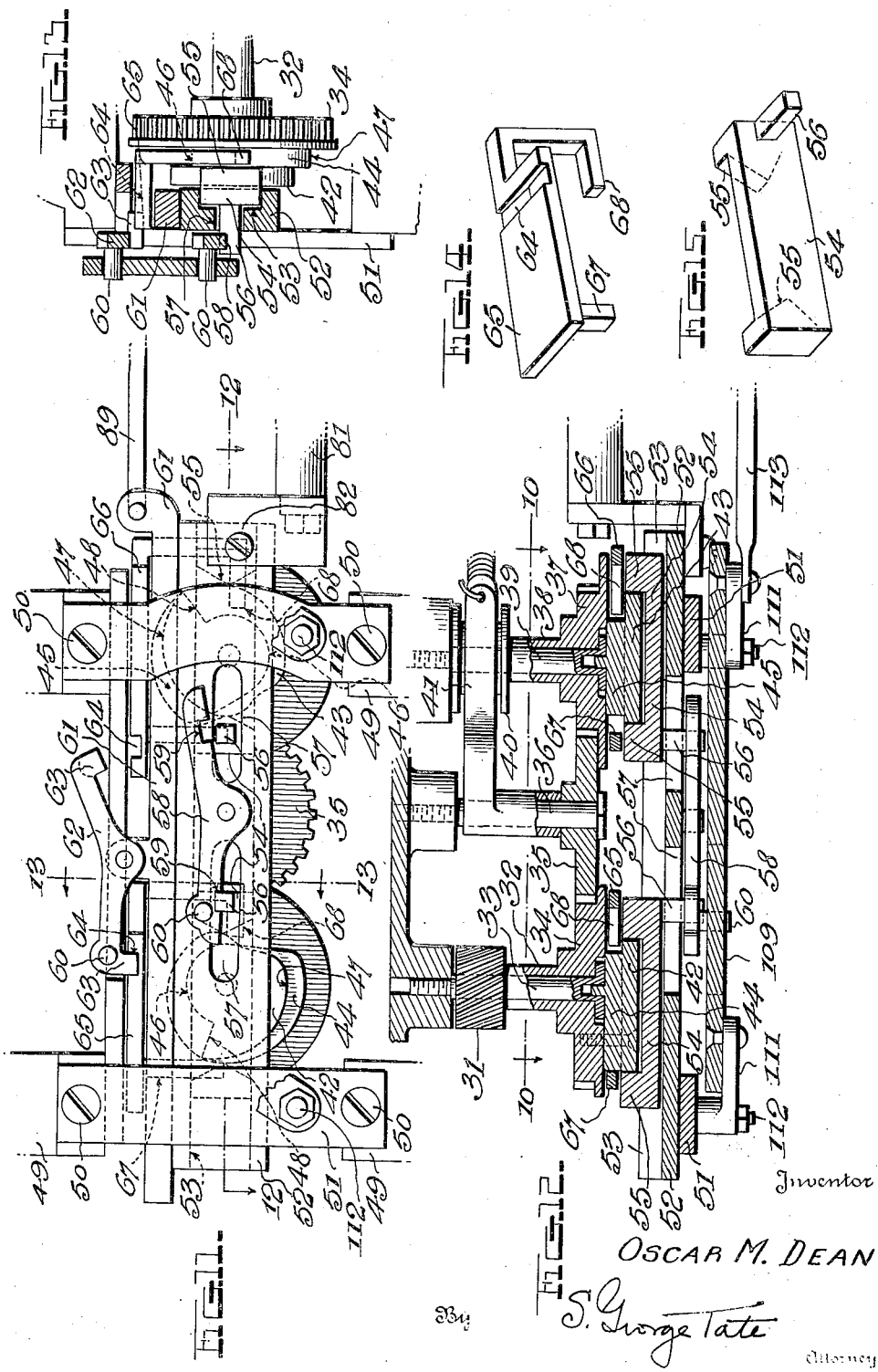

Patented Mar. 9, 1937

2,073,195

UNITED STATES PATENT OFFICE 2,073,195

FUR CUTTING MACHINE

Oscar M. Dean, Sioux City, Iowa

Application January 16, 1935, Serial No. 2112

38 Claims. (Cl. 164—50)

My present invention relates generally to the art of cutting fur bearing hides, or more particularly to the art of notching the edges of fur bearing hides which are to be sewed together, and primarily has for its object to provide a machine embodying novel mechanisms for performing this function.

It has been discovered in the fur garment industry that the line of stitching between two skins can be fairly well concealed by providing the edges of the skins with interfitting notches and sewing the skins together along the edges of these notches. It has also been found difficult to cut fur bearing hides along any desired line without objectionably severing hairs of the hide during the cutting process. In application Serial No. 2,111, filed Jan. 16, 1935, I disclosed a novel fur cutting machine capable of cutting fur bearing hides along a desired line without objectionably severing hairs, the particular line disclosed being the desired notched or zig-zag line. The mechanisms disclosed in the application referred to included a narrow flat, two-edged cutting element, means to feed or advance the hides, means to impart reciprocation to the cutting element and also movement of translation back and forth across the path of hide advancement to effect the notched-line or zig-zag path of cut, and means to assure presentation of the flat of the cutting element always in line with the cut being made.

In its more detailed nature, my present invention seeks to provide a novel fur cutting machine embodying certain new and useful improvements over the mechanisms disclosed in the application above referred to and including the narrow, flat, two-edged cutting element, novel means to reciprocably and swingably support the cutting element, novel means for imparting translatory movement to the cutting element, novel means for varying the degree of translatory movement, novel means for correlating the translatory movement and the hide advancing movement, novel means for controlling the position of the cutting element to aline the flat thereof with the line of cut being made, and novel driving connections for effecting operation of the various mechanisms.

With the above and other objects in view which will more fully appear, the nature of the invention will be more clearly understood by following the description, the appended claims, and the several views illustrated in the accompanying drawings.

In the drawings:—

Figure 1 is a left side elevation of my machine with the removable frame portion removed.

Figure 2 is a longitudinal section of the machine looking from the left side, parts thereof being removed to show the cutting element translating cams in left hand elevation.

Figure 3 is a longitudinal section of the machine looking from the right side, the section being taken substantially through the plan in which the energy restoring and releasing cams lie.

Figure 4 is a horizontal section taken substantially on the line 4—4 on Figure 2.

Figure 5 is a vertical cross section taken on the line 5—5 on Figure 1.

Figure 6 is a vertical cross section taken on the line 6—6 on Figure 1.

Figure 7 is a vertical cross section taken on the line 7—7 on Figure 2.

Figure 8 is a vertical cross section taken on the line 8—8 on Figure 2.

Figure 9 is a detailed horizontal section taken on the line 9—9 on Figure 2.

Figure 10 is a detailed sectional elevation taken on the line 10—10 on Figure 12.

Figure 11 is a left hand elevation of the reverse side of the parts shown in Figure 10.

Figure 12 is a horizontal section taken on the line 12—12 on Figure 11.

Figure 13 is a detail vertical cross section taken on the line 13—13 on Figure 11.

Figure 14 is a detail perspective view of one of the selective energy restoring and releasing slides.

Figure 15 is a detail perspective view of one of the selective translatory movement transmitting slides.

Figure 16 is a diagrammatic plan view illustrating a section of the hide passing over the supporting plate and the formation of a continuous zig-zag or notched-line cut therein.

Figure 17 is a diagrammatic plan view illustrating the manner in which the hide and the cutting element move relatively to cause the cutting element to form a continuous zig-zag or notched-line cut.

Figure 18 is a diagrammatic plan view illustrating the feature of adjusting the cam speed to compensate for the adjustment of the size of the notches being cut.

Like reference numerals designate corresponding parts throughout the several figures of the drawings.

In my improved machine the frame includes a base 5, a standard 6, an overhanging arm 7, and a front head 8 supported at the free end of the overhanging arm. The arm and standard portions of the frame are formed in half sections one, designated 9, being removable to provide access to the mechanisms housed within the arm and standard portions and secured to the frame proper by screws as indicated at 10. For similar purposes the front wall of the head 8 is open and the mechanism therein is accessible through a removable front plate 11.

A main shaft 12 is rotatably supported in bearings 13 in the frame and within the arm portions 7 the shaft is equipped with a driver worm 14. The shaft extends into the front head 8 where it is equipped with a crank disc 15 and roller crank 16 and also extends through the rear end of the frame where it is equipped with a driver pulley 17 and handwheel 18.

The driver worm 14 meshes with a worm wheel 19 loosely mounted on a stud shaft 20 secured to the frame and a sleeve 21 is rotatably supported on the stud and carries a driver worm portion 22 and a ratchet portion 23. The ratchet 23 is engaged by a pawl 24 pivotally mounted on the worm wheel 19 and held in constant yielding contact with the ratchet by a spring 25. The worm 22 meshes with a worm 26 on the driver shaft 27 which is rotatably mounted in bearings 28 in the frame and extends into the front head 8 where it is equipped with a hide advancing gear 29, the purpose for which will become apparent as the description progresses. A driver worm wheel 30 is carried by the shaft 27 and by reason of the provision of the ratchet equipment 23, 24, it is possible to drive this worm in one direction only.

The worm 30 imparts rotation to a worm 30 carried by a sleeve 32 having rotative bearing on the stud shaft 33 supported on the frame and this sleeve also carries a flanged gear 34. The gear 34 meshes with a slightly smaller intermediate gear 35 rotatably mounted on the stud shaft 36 and which imparts rotary movement from the gear 34 to a slightly smaller flanged gear 37 carried by a sleeve 38 rotatably mounted on the stud shaft 39 supported by the frame. Thus it will be seen that whenever the main shaft 12 is rotating in the proper direction it will impart constant rotation to the flanged gears 34 and 37, the speed of rotation of the latter being slightly in excess of the former for a purpose that will be described later.

The sleeve 38 also carries a brake pulley 40 which is engaged by a spring-actuated brake arm 41. This equipment tends to govern the speed of rotation of the gears 34 and 37 and overcomes any tendency of the parts to coast or move at an accelerated speed upon sudden load release.

A heart shaped cam 42 is carried by the gear 34 and a similar cam 43 is carried by the gear 37. These cams serve, in a manner later to be described, to impart translatory movement to the reciprocating cutting element and differ slightly in size, the former being effective to produce a greater amount of such movement than the latter is capable of effecting.

The flange gear 34 also carries an energy restoring and releasing cam portion 44, and a similar cam portion 45 rotates with the flanged gear 37. Each of the cam portions 44 and 45 include a dwell portion 46, an energy storing portion 47, and an energy releasing portion 48. These cam portions are positioned for perfect cooperation with the accompanying cams 42 and 43 and like said cams are selective, that is, one only thereof is effective at a given time, the remaining cam and cam portion being at that time ineffective to impart translatory movement or the energy storing or releasing function.

Secured to support frame blocks 49, as at 50, is a bearing frame 51 which affords slide bearing for a main slide 52. The slide 52 provides a slideway 53 in which two movement transmitting slides 54 are independently slidable. One of the slides 54 is shown in detail in Figure 15 of the drawings and each such slide includes a pair of spaced lugs 55 between which the respective cams 42 and 43 operate as shown in Figures 11 and 12 of the drawings.

Each slide 54 also includes a clutch pin 56 and the pins 56 project through longitudinal slotways 57 in the slide 52 in a position for being selectively engaged by the rockable clutch member 58 pivotally supported upon the slide 52 between said pins and provided at its respective ends with notches 59 for engaging one or the other of said pins. In Figure 11 of the drawings, the pin 56 associated with the cam 42 is clutch connected to the slide 52 and therefore the cam 42 will be effective for imparting movement to said slide. At this time the other slide 54 and pin 56 engaged by the cam 43 will idle back and forth in the slide 52 without effect thereon. The clutch member 58 includes a shifter pin 60 by means of which the position of the clutch element may be changed in a manner that will be described later.

In addition to the translatory movement of the cutting element, essential to the provision of the desired zig-zag or notched-line cut, I provide an improved means for shifting the position of the narrow flat cutting element so as to cause the flat of the element always to aline with the portion of the cut being made and thereby assure smooth cutting. This mechanism includes a slide member 61 slidably supported by the slide member 52, and like the slide member 52, the member 61 carries a rockable clutch member 62 equipped at its ends with lock fingers 63, and, like the clutch member 58, the member is equipped with a shifter pin 60 the purpose for which will become apparent. The clutch member 62 is disposed between two energy storing and releasing slide members, each including a slot or recess 64 for receiving one of the lock fingers 63. The tension storing and releasing slide members are respectively designated 65 and 66 and one thereof is shown in detail in Figure 14. Each member 65, 66 includes a pair of spaced follower lugs 67 and 68 for engaging the respective cam portions 44 and 45, see Figures 3 and 11.

Within the portion 8, at each side of the crank disc 15, is mounted a slide guide 69 and these guides provide a vertical guideway for a slide block 70 having a cross groove in which the crank roller 16 operates. The block 70 includes a pair of spaced and forwardly extending ears 71 in which a block member 72 has trunnion bearing as at 73. The block member 72 swingably supports the cutter bar 74. The cutter bar is vertically reciprocated by operation of the crank disc and roller 15, 16 and while it is rotatably supported in the block member 72, it is held against longitudinal movement relative to the block member by collars 75.

A shifter sleeve 76 is spline connected as at 77 on the cutter bar and the sleeve is rotatable, or more specifically oscillatable, in a bearing sleeve 78 having trunnion bearing as at 79 in the spaced ears of a shifter head 80 connected to a slidable shifter rod 81 which is connected as at 82 to the main slide 52 hereinbefore referred to. Thus movement of the slide member 52 back and forth will impart swinging translatory movement to the cutter bar 74. See Figures 3, 7 and 8.

A crank 83 extends from the sleeve 76 and is operable through 90° or a quarter turn between stop limits 84 formed on the sleeve 78 and a shifter rod 85 connects with the crank and is longitudinally shiftable through the medium of a lever 86 intermediately pivoted as at 87 on the frame and having a spring cushioned connection with the rod as indicated at 88. The other end of the lever 86 is connected through the medium of a thrust rod 89 with the slide member 61 hereinbefore referred to so that movement of the slide member 61 is capable of imparting a partial rotation of the cutter bar 74 about its axis.

A pair of fixed collars 90 are mounted on the shifter rod 89 and between the fixed collars are disposed a pair of slidable collars 91. Between each adjacent pair of collars 90, 91 is interposed a tension storing coiled spring 92. A shifter lever 93 is pivoted intermediate its ends as at 94 on the machine frame and has one end thereof interposed between the pair of slidable collars 91 and its other end slot and pin connected as at 95 to the shifter rod 81 as shown in Figures 1, 2 and 3 of the drawings. This equipment serves to store tension and effect a quick shifting of the cutter bar 74 about its axis at the end of the translatory movements thereof in either direction in a manner that will be described in detail hereinafter.

The cutting element 96 removably secured at the lower end of the cutter bar 74 is in the nature of a narrow flat blade having two cutting edges merging into a centrally disposed piercing or penetrating point. At each side of the cutting element is provided a toothed hide advancing roller 97 and each roller is mounted on a shaft 98 having rotative bearing in the head portion 8 and including a driver gear portion 99. The driven gears 99 mesh with a common driver gear as shown in Figures 2 and 8 of the drawings and the idle driving gear 100 has rotation imparted thereto by the shaft 27 and driver pinion 29.

The hide advancing rollers 97 are opposed by a hide supporting plate 101 which is supported by a rocker arm 102 pivotally supported on the frame as at 103. The plate 101 is pivotally supported as at 104 and as at 105 on said arm, the pivots being disposed at right angles as indicated in Figures 2 and 6 so as to provide a universal tiltable mounting for said plate. The plate is provided with an opening 106 to accommodate the reciprocatory and translatory movements of the cutting element and also to provide suitable freedom for the hairs of the hide so that they will be deflected but not cut by the narrow cutting element.

The plate 101 is yieldably urged against the rollers 97 by a spring 107, and a push rod 108 connected with a suitable treadle (not shown) may be utilized to separate the plate from the rollers to facilitate insertion and removal of a hide.

In Figures 1, 4 and 12, I have shown a means for simultaneously shifting the clutch members 58 and 62 from the position illustrated in Figure 11 in which the cams 42, 44 and slide member 65 are effective to the opposite position in which the cams 43 and 45 and the slide member 66 will be effective or vice versa. This means comprises a shiftable plate 109 having parallel slots 110 for receiving the clutch member actuated pins 60 and supported on parallel links 111 pivoted as at 112 upon the bearing frame 51. A shifter rod 113 is connected to the plate and extends through the frame head portion 8 where it is equipped with an actuator button and notches 114 adapted to cooperate with the plate 11 to secure the plate 109 in one or the other of its two positions. When the rod 113 is pulled forwardly as shown in Figure 1 the slots 110 will force the pins downwardly and effect the clutched position shown in Figure 11. When the rod 113 is pushed rearwardly the plate 109 will be elevated and the slots 110, engaging the pins 60, will reverse the position of the clutch members 58 and 62.

In operation the rapid rotation of the shaft 12 will be transmitted in the form of rapid vertical or axial reciprocations to the cutter bar 74 by the disc 15 and roller. The rapid rotation of the shaft 12 will likewise be transmitted in the form of relatively slow rotation to the shaft 27 and the hide advancing rollers 97 in constantly timed relation. It will also be obvious that by rotation of one or the other of the cams 42 and 43 and the connections thereof with the slide 52 and member 80, 81, the cutter bar 74 will be swung or translated back and forth moving the reciprocating cutting element slowly back and forth across the path of the advancing hide.

The result of slowly advancing the hide and slowly translating the cutting element back and forth across the path of advancement of the hide, is the formation of a continuous zig-zag or notched-line cut, each zig $x$ and each zag $y$ of such cut being formed by a rapid succession of individual narrow cuts formed by the cutting element as shown in Figures 16 and 17. In forming this cut the flat of the narrow cutting element always alines with the line of cut so as to assure a smooth edge cut. This is made possible because any given unit or distance of hide advancement is attended by a like unit or distance of translatory movement of the cutting element and consequently the piercing or penetrating point of the flat cutting element will always strike the hide in the desired line of cut as shown in Figure 17, and at the completion of the succession of cuts forming each zig or zag, and while the cutting element is elevated out of contact with the hide, the element is rotated 90° about its axis as hereinbefore described so as to aline the flat thereof with the zig or zag next to be cut.

The number of cutting element reciprocations, or in other words the number of successive individual cuts, utilized to form the individual zigs and zags of the continuous line cut may vary but always are relatively narrow so as to enable the narrow element to pass between the hairs deflecting but not cutting the same.

In diagrammatic Figure 17 the heavy dots serve to indicate the individual points of penetration and the crossed light lines therefore illustrate what might be termed units of movement, of advancing movement with respect to the hide, and of movement of translation with respect to the cutting element. It will be observed that the points of penetration are spaced apart a distance less than the width or major cross sectional area of the cutting element. Thus positioned a continuous line cut is assured. When the piercing or penetrating points are spaced apart a distance less than half the width of the element as shown in Figure 17, one cutting edge alone of the element will be effective in forming the line cut in a given direction.

In Figures 3, 11 and 12, the cams 42, 44 and the slide member 65 are clutch-connected and effective to impart movement to the slides 52 and 61. As hereinbefore stated this adjustment of parts is effective to impart to the cutter bar the greatest degree of translatory movement and therefore larger notches or cuts in the fur than would be cut if the cams 43 and 45 were effective. The parts may be adjusted so that one set of controls will effect the cutting of a one inch notch whereas the other set will effect the cutting of a three-quarter inch notch. As before stated the speed of advancement of the hide is constant and if both of the translatory movement imparting cams 42 and 53 were rotated at the same speed each would effect the movement of translation during the same degree of advancement of the hide with the result that the angles of the two sizes of notches cut by the machine would vary. In Figure 18 I have attempted to illustrate this feature. In this figure I have illustrated diagrammatically a portion of hide and the direction of advancement thereof and the direction of translatory movement of the cutting element. A small notch is indicated at *a* and a larger notch is indicated at *b*. The distances A—B and C—D respectively indicate the distances which the hide must travel during the formation of the notches *a* and *b* in order that the angles of the notches will be the same.

In order to assure the formation of notches of the same angle regardless of size, I have devised means for varying the speed of rotation of the cams so as to compensate for the differences in the translatory movement effected by the respective adjustments. By reason of the reduction gearing 35, 37, the cam 43 is rotated at a greater speed than the cam 42. The cam 43 imparts the least amount of translatory movement and therefore controls the cutting of the small notch *a*. Thus the translatory movement effected by the cam 43 will be completed more rapidly than will be the translatory movement effected by the cam 42 and therefore will be attended by the lesser hide advancing interval indicated at A, B. The speed of rotation of the respective cams is thus so related that each degree of translatory movement effected is attended by just the right amount of hide advancing movement to assure the cutting of notches of like angle regardless of size.

In Figure 3 of the drawings, the cam 42 is shown moving the slide 52 and the cutter bar 74 to the right and this movement is nearing completion. It will be obvious that the movement of the rod 81 toward the right has moved the upper end of the lever 93 toward the left and has stored tension in the left hand spring 93 tending to force the shifter rod 89 toward the left and the rod 85 toward the right. This movement of the slide 61 and rods 89 and 85 is prevented, however, by contact of the tension storing portion 47 of the cam 44 with the right hand lug of the slide member 65. As soon as the release portion 48 of the cam 44 clears the lug the tension stored up in the spring will serve to quickly shift the slide 61 and rods 89 and 85 and effect a quarter turn of the cutting element to aline the slide thereof with the cut next to be made as shown in Figures 16 and 17 of the drawings. Upon the reverse movement of the slide 52 and rod 81 tension will be stored up in the right hand spring and upon completion of the translatory movement of the cutter bar toward the left the cutter bar adjustment above described will be reversed. In each direction the energy storing portion of the cams 44 and 45 will prevent movement of the slide 61 until the respective slide lugs 67 or 68 clear the release points 48 of the cams thus preventing shifting of the position of the cutting element except at the completion of the translatory movement and while the cutting element is elevated out of contact with the hide. By reason of the ratchet and pawl connections 23 and 24, it is possible to rotate the cams 43 and 44 in one direction only and all danger of the portions 48 of the cams locking with and breaking the lugs 68 is avoided.

It is of course to be understood that the details of structure and arrangement of parts may be variously changed and modified without departing from the spirit and scope of my invention.

I claim:—

1. In a fur notching machine, a slender cutting element adapted for forming narrow cuts in a fur bearing hide, means for reciprocably and swingably supporting said element, means for reciprocating the element, means for advancing the hide past the element to be repeatedly pierced thereby, and means for swinging the element back and forth across the path of advancement of the hide.

2. In a fur notching machine, a slender cutting element adapted for forming narrow cuts in a fur bearing hide, means for reciprocably and swingably supporting said element, means for rapidly reciprocating the element, means for slowly advancing the hide past the element to be repeatedly pierced thereby, and means for slowly swinging the element back and forth across the path of advancement of the hide.

3. In a fur notching machine, a slender cutting element adapted for forming narrow cuts in a fur bearing hide, means for reciprocating the element longitudinally, means for advancing the hide past the element to be repeatedly pierced thereby, means for translating the element back and forth across the path of advancement of the hide, means for varying the degree of movement of translation of the element, and means for varying the speed of the translatory movement of the element.

4. In a fur notching machine, a slender cutting element adapted for forming narrow cuts in a fur bearing hide, means for reciprocating the element longitudinally, means for advancing the hide past the element to be repeatedly pierced thereby, means for translating the element back and forth across the path of advancement of the hide, means for increasing the degree of movement of translation of the element, and means for correspondingly increasing the time interval necessary to complete a given movement of translation.

5. In a fur notching machine, a slender cutting element adapted for forming narrow cuts in a fur bearing hide, means for reciprocating the element longitudinally, means for advancing the hide past the element to be repeatedly pierced thereby, means for translating the element back and forth across the path of advancement of the hide, means for varying the degree of movement of translation of the element, and means for varying the relative speeds of the hide advancing and element translating movements to enable the cutting of like angled different size notches.

6. In a fur notching machine, a slender cutting element adapted for forming narrow cuts in a fur bearing hide, means for reciprocably and swingably supporting said element, means for reciprocating the element, means for advancing the hide past the element to be repeatedly pierced thereby, and means for swinging the element back and forth across the path of advancement of the hide including devices for varying the degree of swinging movement of the element and also the interval of time spent in the accomplishment of a swing back and forth of said element.

7. In a fur notching machine, a slender cutting element adapted for forming narrow cuts in a fur bearing hide, means for reciprocably and swingably supporting said element, means for reciprocating the element, means for advancing the hide past the element to be repeatedly pierced thereby, and means for swinging the element back and forth across the path of advancement of the hide including devices enabling the increasing of the degree of swinging movement of the element and the corresponding increasing of the interval of time spent in the accomplishment of a swing back and forth of said element.

8. In a fur notching machine, a slender cutting element adapted for forming narrow cuts in a fur bearing hide, means for reciprocably and swingably supporting said element, means for reciprocating the element, means for advancing the hide past the element to be repeatedly pierced thereby, means for swinging the element back and forth across the path of advancement of the hide, and means for varying the relative speeds of hide advancing and element swinging movements to enable the cutting of like angled different size notches.

9. In a fur notching machine, a slender cutting element adapted for forming narrow cuts in a fur bearing hide, means for reciprocating the element longitudinally, means for advancing the hide past the element to be repeatedly pierced thereby, means for translating the element back and forth across the path of advancement of the hide including a pair of cams selectively operable one to impart to the element a given degree of movement of translation and the other a greater degree of such movement, and means for operating the cams at different speeds.

10. In a fur notching machine, a slender cutting element adapted for forming narrow cuts in a fur bearing hide, means for reciprocating the element longitudinally, means for advancing the hide past the element to be repeatedly pierced thereby, means for translating the element back and forth across the path of advancement of the hide including a pair of cams selectively operable one to impart to the element a given degree of movement of translation and the other a greater degree of such movement, and means for operating the cam which imparts the greatest degree of movement at a slower speed than the other cam.

11. In a fur notching machine, a slender cutting element adapted for forming narrow cuts in a fur bearing hide, means for reciprocating the element longitudinally, means for advancing the hide past the element to be repeatedly pierced thereby, means for translating the element back and forth across the path of advancement of the hide including a pair of cams selectively operable one to impart to the element a given degree of movement of translation and the other a greater degree of such movement, and means to vary the relative speeds of movement of the respective cams and the hide advancing means to enable the cutting of like angled different size notches.

12. In a fur notching machine, the combination of a hide advancing means, a reciprocating narrow flat cutting element having two cutting edges merging into a central piercing point and disposed with the flat thereof presented in 45° angular relation to the direction of advancement of the hide, means to impart translatory movement to the element back and forth across the path of advancement of the hide, rotary cam controlled means for turning the element 90° about its axis at the completion of translatory movement in one direction and for returning said element to its original position at the completion of translatory movement in the opposite direction, means to vary the degree and speed of translatory movement of the element, and means to vary the timing of said rotary cam controlled means.

13. In a fur cutting machine, a slender flat cutting element having a penetrating point, means for supporting the element, means for reciprocating the element in its support, spring means tending to rotate the element about its axis, and rotary cam controlled means for at times securing the element against rotation and serving at other times to release the element to permit it to partake of partial rotation about its axis.

14. In a fur cutting machine, a cutter bar and a slender flat cutting element having a penetrating point carried thereby, means for reciprocably supporting the bar, a sleeve spline-connected to said bar and having a crank extension, means for bringing about relative movement between the fur and the bar to cause the element to repeatedly pierce the fur along a zig-zag line of cut each zig and zag of which is formed by a succession of individual conjoint cuts, and means for shifting the crank extension at the completion of each zig or zag to position the flat of the element in the line of the zig or zag next to be cut.

15. In a fur cutting machine, a cutter bar and a slender flat cutting element having a penetrating point carried thereby, means for reciprocably supporting the bar, a sleeve spline-connected to said bar and having a crank extension, means for bringing about relative movement between the fur and the bar to cause the element to repeatedly pierce the fur along a zig-zag line of cut each zig and zag of which is formed by a succession of individual conjoint cuts, a shifter rod for shifting the crank extension at the completion of each zig or zag to position the flat of the element in the line of the zig or zag next to be cut, means to yieldably urge the rod in the shifting direction, and means to secure the rod against shifting movement until the completion of each zig or zag and then release the rod to permit shifting of said crank.

16. In a fur cutting machine, a cutter bar and a slender flat cutting element having a penetrating point carried thereby, means for reciprocably supporting the bar, means for reciprocating the bar, means for advancing the fur past the reciprocating element, means to move the bar back and forth across the path of advancement of the fur to cause the element to repeatedly pierce the fur along a zig-zag line of cut, each zig and zag of which is formed by a succession of individual conjoint cuts, a sleeve spline-connected to the bar and having a crank extension, and a shifter rod for shifting the crank extension at the completion of each back and forth movement of the bar to position the flat of the element in line with the zig or zag next to be cut.

17. In a fur cutting machine, a cutter bar and a slender flat cutting element having a penetrating point carried thereby, means for reciprocably supporting the bar, means for reciprocating the bar, means for advancing the fur past the reciprocating element, means to move the bar back and forth across the path of advancement of the fur to cause the element to repeatedly pierce the fur along a zig-zag line of cut, each zig and zag of which is formed by a succession of individual conjoint cuts, a sleeve spline-connected to the bar and having a crank extension, a shifter rod for shifting the crank extension at the completion of each back and forth movement of the bar to position the flat of the element in line with the zig or zag next to be cut, means to yieldably urge the rod in the shifting direction, and means for securing the rod against shifting during back and forth movement of the bar and for releasing the rod to permit it to shift at the completion of each back or forth movement.

18. In a fur cutting machine, a slender flat cutting element having a penetrating point, means for reciprocably and swingably supporting said element, means to reciprocate the element, means to swing the element back and forth while it is reciprocating, means including spring devices tending to rotate the element about its axis, and means for overcoming the spring urge during swinging movement of the element and for yielding to the spring urge at the completion of each back or forth swinging movement to permit partial rotation of the element about its axis.

19. In a fur cutting machine, a slender flat cutting element having a penetrating point, means for reciprocably and swingably supporting said element, means to reciprocate the element, means to swing the element back and forth while it is reciprocating, means including spring devices tending to rotate the element about its axis, means including a rotary cam for overcoming the spring urge during swinging movement of the element and for yielding to the spring urge at the completion of each back or forth swinging movement to permit partial rotation of the element about its axis, and means for rotating the cam in one direction only.

20. In a fur cutting machine, a slender flat cutting element having a penetrating point, means for reciprocably and swingably supporting said element, means to reciprocate the element, means to swing the element back and forth while it is reciprocating, means including spring devices tending to rotate the element about its axis, means for overcoming the spring urge during swinging movement of the element and for yielding to the spring urge at the completion of each back or forth swinging movement to permit partial rotation of the element about its axis, and means for storing energy in the spring devices during swinging movements of the element.

21. In a fur cutting machine, a cutter bar and a slender flat cutting element having a penetrating point carried thereby, means for reciprocably supporting the bar, means for reciprocating the bar, means for advancing the fur past the reciprocating element, means including a bearing sleeve to move the bar back and forth across the path of advancement of the fur to cause the element to repeatedly pierce the fur along a zig-zag line of cut, each zig and zag of which is formed by a succession of individual conjoint cuts, a sleeve rotatably supported in the bearing sleeve and spline-connected to the bar and having a crank extension, and a shifter rod for shifting the crank extension at the completion of each back and forth movement of the bar to position the flat of the element in line with the zig or zag next to be cut, said bearing sleeve having provision to limit shifting movement of the crank.

22. In a fur notching machine, a frame, hide advancing means, a reciprocable cutting element, means to reciprocate the element, and means to translate the reciprocating element a greater or lesser degree back and forth across the path of advancement of the hide, said translating means including a plurality of selective cams each capable of imparting a different degree of translatory movement, and means operable from without the frame for rendering a selected one of the cams operable.

23. In a fur notching machine, a frame, hide advancing means, a reciprocable narrow flat cutting element having a penetrating point, means to reciprocate the element, and means to translate the reciprocating element a greater or lesser degree back and forth across the path of advancement of the hide, said translating means including a plurality of selective cams each capable of imparting a different degree of translatory movement, a plurality of sets of devices each set capable of shifting the position of the flat of the element to aline it with the portion of cut next to be formed after completion of a predetermined different degree of translatory movement of the element, and means operable from without the frame for rendering a selected one of the cams and a selected one of said sets of devices operaable.

24. In a fur cutting machine, the combination of a cutting element mounted for reciprocatory and translatory movements; means for imparting the translatory movement comprising a shifter member having connection with the element, a slide member connected to the shifter member, a rotary cam, an idler slide slidable relative to the slide member and engaging the cam to be moved back and forth thereby, and clutch means adjustable to connect the slide member and the idler slide to move together or to disconnect them to permit the idler slide to idle back and forth.

25. In a fur cutting machine, the combination of a cutting element mounted for reciprocatory and translatory movements; means for imparting the translatory movement comprising a shifter member having connection with the element, a pair of rotary cams each capable of imparting a different degree of movement, a pair of idler slides each engageable with and moved back and forth by one of the cams, a slide member connected to the shifter member, and means to connect the slide member to one or the other of the idler slides for movement therewith.

26. In a fur cutting machine, a cutter bar and a slender flat cutting element having a penetrating point carried thereby, means for reciprocably supporting the bar, means for reciprocating the bar, means for advancing the fur past the reciprocating element, means to move the bar back and forth across the path of advancement of the fur to cause the element to repeatedly pierce the fur along a zig-zag line of cut, each zig and zag of which is formed by a succession of individual conjoint cuts, means effective during each of the back and forth movements of the bar for storing up energy tending to move the rod in the crank shifting direction, and means for securing the rod against shifting during back and forth movement of the bar and for releasing the rod to permit it to shift at the completion of each back or forth movement.

27. In a fur cutting machine, a cutter bar and a slender flat cutting element having a penetrating point carried thereby, means for reciprocably supporting the bar, means for reciprocating the bar, means for advancing the fur past the reciprocating element, means including a translating member to move the bar back and forth across the path of advancement of the fur to cause the element to repeatedly pierce the fur along a zig-zag line of cut, each zig and zag of which is formed by a succession of individual conjoint cuts, a crank connected to the bar and adapted upon completion of each back and forth movement of the bar to shift the position of the bar and position the flat of the element in line with the zig or zag next to be cut, a rod for shifting the crank and having spring means associated therewith, means movable with the translating member for storing energy in the spring means and tending to move the shifting rod, and means securing the shifter rod against movement during movement of the translating member in a given direction and effective upon completion of translatory member movement to release the shifter rod and permit the stored energy to effect shifting of the crank.

28. In a fur cutting machine, the combination of a cutting element mounted for reciprocatory and translatory movements; means for imparting the translatory movement comprising a shifter member having connection with the element, a pair of rotary cams each capable of imparting a different degree of movement, a pair of idler slides each engageable with and moved back and forth by one of the cams, a slide member connected to the shifter member, means to connect the slide member to one or the other of the idler slides for movement therewith, and means for imparting rotation to one of the cams at a greater speed than the other cam.

29. In a fur cutting machine, the combination of a cutting element mounted for reciprocatory and translatory movements; means for imparting the translatory movement comprising a shifter member having connection with the element, a pair of rotary cams each capable of imparting a different degree of movement, a pair of idler slides each engageable with and moved back and forth by one of the cams, a slide member connected to the shifter member, means to connect the slide member to one or the other of the idler slides for movement therewith, and means for imparting rotation to the cam having the greatest throw at a speed less than that of the cam having the least throw.

30. In a fur cutting machine, a cutter bar and a slender flat cutting element having a penetrating point carried thereby, means for reciprocably supporting the bar, a sleeve spline-connected to said bar and having a crank extension, means for bringing about relative movement between the fur and the bar to cause the element to repeatedly pierce the fur along a zig-zag line of cut each zig and zag of which is formed by a succession of individual conjoint cuts, a shifter rod for shifting the crank extension at the completion of each zig or zag to position the flat of the element in the line of the zig or zag next to be cut, means to yieldably urge the rod in the shifting direction, and means to secure the rod against shifting movement until the completion of each zig or zag and then release the rod to permit shifting of said crank, said last named means comprising a slide member connected to the shifter rod, a rotary cam having an energy storing and securing and a rod release portion, a slide slidable relative to the slide member and engaging the cam to be controlled in movement thereby, and clutch means adjustable to connect the slide and the slide member to move together or to disconnect them to permit the slide to idle.

31. In a fur cutting machine, a frame, a cutter bar and a slender flat cutting element having a penetrating point carried thereby, means for reciprocably supporting the bar, a sleeve spline-connected to said bar and having a crank extension, means for bringing about relative movement between the fur and the bar to cause the element to repeatedly pierce the fur along a zig-zag line of cut each zig and zag of which is formed by a succession of individual conjoint cuts, a shifter rod for shifting the crank extension at the completion of each zig or zag to position the flat of the element in the line of the zig or zag next to be cut, means to yieldably urge the rod in the shifting direction, and means to secure the rod against shifting movement until the completion of each zig or zag and then release the rod to permit shifting of said crank, said last named means comprising a slide member connected to the shifter rod, a rotary cam having an energy storing and securing and a rod release portion, a slide slidable relative to the slide member and engaging the cam to be controlled in movement thereby, clutch means adjustable to connect the slide and the slide member to move together or to disconnect them to permit the slide to idle, and means operable from without the frame for actuating the clutch means.

32. In a fur cutting machine, a cutter bar and a slender flat cutting element having a penetrating point carried thereby, means for reciprocably supporting the bar, a sleeve spline-connected to said bar and having a crank extension, means for bringing about relative movement between the fur and the bar to cause the element to repeatedly pierce the fur along a zig-zag line of cut each zig and zag of which is formed by a succession of individual conjoint cuts, a shifter rod for shifting the crank extension at the completion of each zig or zag to position the flat of the element in the line of the zig or zag next to be cut, means to yieldably urge the rod in the shifting direction, and means to secure the rod against shifting movement until the completion of each zig or zag and then release the rod to permit shifting of said crank, said last named means comprising a slide member connected to the shifter rod, a pair of selective rotary cams each having an energy storing and securing and a rod release portion disposed to effect a rod release at a point peculiar to the particular cam, a pair of selective slides slidable relative to the slide member each slide engaging and controlled in movement by one of the cams, and clutch means adjustable to connect one or the other of the slides and the cam which it engages with the slide member to render the connected slide effective and permit the non-connected slide to idle back and forth.

33. In a fur cutting machine, the combination of a cutting element, means including a longitudinally reciprocable slide member for imparting back and forth movement to the element, means including a second slide member for adjusting the movement of the element about its axis, a pair of rotary cams associated with the first slide member and each capable of imparting a different degree of back and forth movement, a pair of idler slides engageable with and moved back and forth by one of the first slide member associated cams, clutch means adjustable to connect the first slide member with one or the other of the idler slides and the cam which it engages, a second pair of rotary cams associated with the second slide member and each capable of exercising a different movement control of the second slide member, a second pair of idler slides engageable with and controlled in movement by the second pair of cams, and clutch means adjustable to connect the second slide member with one or the other of the second idler slides and the cam which it engages.

34. In a fur cutting machine, the combination of a cutting element, means including a longitudinally reciprocable slide member for imparting back and forth movement to the element, means including a second slide member for adjusting the movement of the element about its axis, a pair of rotary cams associated with the first slide member and each capable of imparting a different degree of back and forth movement, a pair of idler slides engageable with and moved back and forth by one of the first slide member associated cams, clutch means adjustable to connect the first slide member with one or the other of the idler slides and the cam which it engages, a second pair of rotary cams associated with the second slide member and each capable of exercising a different movement control of the second slide member, a second pair of idler slides engageable with and controlled in movement by the second pair of cams, clutch means adjustable to connect the second slide member with one or the other of the second idler slides and the cam which it engages, and means for shifting both clutch means simultaneously.

35. In a machine for cutting fur bearing hide, the combination of a reciprocating narrow piercing element, means for advancing a hide past the element, and cam means for positively moving the reciprocating element back and forth across the path of advancement of the hide to cause the individual narrow cuts formed by the element to conjointly form a continuous notched-line or zig-zag cut.

36. In a machine for cutting fur bearing hide, the combination of a narrow piercing element, means for reciprocably and swingably supporting the element, means for reciprocating the element, and means for positively swinging the reciprocating element back and forth across the path of advancement of the hide to cause the individual narrow cuts formed by the element to conjointly form a continuous notched-line or zig-zag cut.

37. In a machine for cutting fur bearing hide, the combination of a reciprocating narrow piercing element, means for advancing a hide past the element, and means including selective cams each capable of imparting a different degree of movement for positively moving the reciprocating element back and forth across the path of advancement of the hide to cause the individual narrow cuts formed by the element to conjointly form a continuous notched-line or zig-zag cut.

38. In a machine for cutting fur bearing hide, the combination of a narrow piercing element, means for reciprocably and swingably supporting the element, means including selective cams each capable of imparting a different degree of movement for reciprocating the element, and means for positively swinging the reciprocating element back and forth across the path of advancement of the hide to cause the individual narrow cuts formed by the element to conjointly form a continuous notched-line or zig-zag cut.

OSCAR M. DEAN.